US012783277B2

(12) United States Patent
Woolf et al.

(10) Patent No.: US 12,783,277 B2
(45) Date of Patent: Nov. 3, 2026

(54) AUTOMATIC GENERATION OF SERVICE INSTANCE MANAGERS

(71) Applicant: International Business Machines Corporation, Armonk, NY (US)

(72) Inventors: Robert Woolf, Raleigh, NC (US); Gregory A. Johnson, Wilmington, NC (US); Neil Delima, Scarborough (CA); Girish Padmanabhan, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/301,559

(22) Filed: Apr. 17, 2023

(65) Prior Publication Data

US 2024/0345862 A1 Oct. 17, 2024

(51) Int. Cl.
*G06F 9/455* (2018.01)

(52) U.S. Cl.
CPC .................... *G06F 9/45558* (2013.01); *G06F 2009/45562* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,467,375 B2 | 12/2008 | Tondreau et al. | |
| 8,612,706 B1 * | 12/2013 | Madril | G06F 3/0653 711/162 |
| 8,881,100 B2 | 11/2014 | Bohm et al. | |
| 9,965,259 B2 | 5/2018 | Vargas | |
| 10,162,610 B2 | 12/2018 | Apte et al. | |
| 10,324,695 B2 | 6/2019 | Champagne | |
| 10,521,210 B1 | 12/2019 | Nandanuru et al. | |
| 2006/0031820 A1 | 2/2006 | Li | |
| 2007/0169018 A1 | 7/2007 | Coward | |

(Continued)

FOREIGN PATENT DOCUMENTS

| | | |
|---|---|---|
| CN | 110442421 B | 11/2019 |
| CN | 113672338 A | 11/2021 |

OTHER PUBLICATIONS

"SDK for Building Kubernetes Applications", retrieved on Feb. 13, 2023 from Internet URL: <https://github.com/operator-framework/operator-sdk>, 5 pgs.

(Continued)

*Primary Examiner* — Umut Onat
(74) *Attorney, Agent, or Firm* — Kelsey M. Skodje, Esq.; Matthew M. Hulihan, Esq.; Heslin Rothenberg Farley & Mesiti P.C.

(57) ABSTRACT

Automatic generation of service instance managers includes automatically generating, from a first representation of a service instance manager for an environment, a second representation of the service instance manager. The first representation and second representation are programmed in different technologies. The automatically generating includes obtaining a universal form into which the first representation was transformed via a transformation, and further includes generating the second representation using the universal form and variable information, recovered from the first representation, lost by the transformation of the first representation into the universal form.

20 Claims, 7 Drawing Sheets

(56) References Cited

U.S. PATENT DOCUMENTS

| | | | | |
|---|---|---|---|---|
| 2008/0306986 | A1 | 12/2008 | Doyle, Sr. | |
| 2009/0064091 | A1 | 3/2009 | Tonkin et al. | |
| 2021/0382754 | A1* | 12/2021 | Nimmagadda | G06F 9/5016 |
| 2022/0012045 | A1* | 1/2022 | Rudraraju | G06F 8/36 |
| 2022/0318001 | A1* | 10/2022 | Freeman | G06F 8/30 |
| 2022/0365851 | A1* | 11/2022 | Simon | G06F 11/1438 |
| 2023/0401077 | A1* | 12/2023 | Anand | G06F 9/44505 |

OTHER PUBLICATIONS

"How to Convert Helm Chart to Kubernetes YAML", retrieved on Feb. 13, 2023 from Internet URL: <https://scriptcrunch.com/convert-helm-chart-kubernetes-yaml/>, 3 pgs.

"Convert Kubernetes YAML to Golang", retrieved on Feb. 13, 2023 from Internet URL: <https://github.com/kris-nova/naml>, 8 pgs.

"Operator Capabilities", retrieved on Apr. 4, 2023 from the Internet URL: <https://operatorframework.io/operator-capabilities/>, 9 pgs.

"Operator Framework", retrieved on Apr. 4, 2023 from the Internet URL: <https://operatorframework.io/>, 3 pgs.

Porutiu, H., et al., "Get started using Kubernetes Operators", IBM Developer, published May 25, 2021, updated Sep. 21, 2021, retrieved on Apr. 4, 2023 from the Internet URL: <https://developer.ibm.com/learningpaths/kubernetes-operators/>, 5 pgs.

Wolf, B., et al., "Use Kubernetes operators to extend Kubernetes' functionality", retrieved on Apr. 4, 2023 from the Internet URL: <https://developer.ibm.com/learningpaths/kubernetes-operators/operators-extend-kubernetes/>, May 25, 2021, 13 pgs.

* cited by examiner

AUTOMATIC GENERATION OF SERVICE INSTANCE MANAGERS

BACKGROUND

Virtual entities, such as containers, exist within an environment and are orchestrated within the environment. Containers are orchestrated by a container orchestrator, for instance, which is used to orchestrate the provisioning and execution of containers in a container environment. The execution of the containers provides service instances that have lifecycles. It is desired to manage those lifecycles (e.g., create, edit, fix, delete, etc. the instance) using various functions. In the context of Kubernetes, a well-known container orchestrator, aspects of service instance lifecycle management can be automated through the use of "operators".

There are various technologies that can be used to program service instance managers. Using the example of operators, some developers, for instance those that are new to operators, often implement them with a relatively easy-to-use technology, such as Helm. A disadvantage to such technologies is that they might support only lower level operators, for instance only Level I and II operators on the well-known scale of operator capabilities published by the Operator Framework. If the developers eventually want to add more sophisticated capabilities, that might be achievable only at a higher level operator, the programming of which requires a more sophisticated technology such as Ansible® for automation or Go (Golang) for programming, as examples (ANSIBLE® is a registered trademark of RED HAT, INC, Raleigh, North Carolina.). One approach would be to have programmed the operator in a more sophisticated technology from the start, but this can be challenging as writing operators in Go (for example) can require greater programmer sophistication. Therefore, to add capabilities (such as those of Level III and greater) to a Helm operator, as an example, it must first be recreated as an equivalent operator implemented in a technology able to support Level III and greater capabilities, such as the Go technology. However, recreation of one operator in another technology can be cumbersome. What is needed is an automated and straightforward way to generate, from a first representation of a service instance manager (e.g., from a source operator) programmed in one technology, a second, equivalent, representation of the service instance manager (e.g., a target operator) programmed in another technology.

SUMMARY

Shortcomings of the prior art are overcome and additional advantages are provided through the application of a computer-implemented method. The method automatically generates, from a first representation of a service instance manager for an environment, a second representation of the service instance manager. The first representation and second representation are programmed in different technologies. The automatic generation includes obtaining a universal form into which the first representation was transformed via a transformation. The automatic generation further includes generating the second representation using the universal form and variable information, recovered from the first representation, lost by the transformation of the first representation into the universal form. Automatic generation of the second representation of the service instance manager from the first representation of the service instance manager, where they are programmed in different technologies, enables easy conversion therebetween without manual reprogramming of the service instance manager in a different technology. This in turn has an advantage in that it facilitates efforts to expand/augment the capabilities of the service instance manager, and in particular when the technology in which the initial (first) representation is programmed is limited in that regard. By generating an equivalent service instance manager but in a second representation programmed in a different, more robust technology than the initial technology, developers are no longer limited to what is supported by the initial technology.

Additionally provided is a computer system that includes a memory and a processor in communication with the memory. The computer system is configured to perform a method that automatically generates, from a first representation of a service instance manager for an environment, a second representation of the service instance manager. The first representation and second representation are programmed in different technologies. The automatic generation includes obtaining a universal form into which the first representation was transformed via a transformation. The automatic generation further includes generating the second representation using the universal form and variable information, recovered from the first representation, lost by the transformation of the first representation into the universal form.

Further provided is a computer program product that includes a computer readable storage medium readable by a processing circuit and storing instructions for execution by the processing circuit for performing a method. The method automatically generates, from a first representation of a service instance manager for an environment, a second representation of the service instance manager. The first representation and second representation are programmed in different technologies. The automatic generation includes obtaining a universal form into which the first representation was transformed via a transformation. The automatic generation further includes generating the second representation using the universal form and variable information, recovered from the first representation, lost by the transformation of the first representation into the universal form.

Additional features and advantages are realized through the concepts described herein, which may be provided as optional, permissive, preferred and/or advantageous additional aspects. For instance, in some embodiments, the environment includes a container orchestrator and the universal form includes resources used by the container orchestrator in managing service instances pursuant to the service instance manager. Further, in some embodiments the container orchestrator is Kubernetes, where the first representation is a first Kubernetes operator programmed in a first language and the second representation is a second Kubernetes operator programmed in a second language that is different from the first language, and the universal form includes Kubernetes resources generated from the first Kubernetes operator. This has an advantage in that the capability is expanded to container environments in which service instance management often occurs on a large scale and reliance on rapid development of increasingly sophisticated managers is common.

In some embodiments, the variable information includes variables in the first representation that impart variability in the first representation, where the variability is configured as constants in the universal form. Automatic generation of the second representation in these situations has an advantage in that the variability, which has been lost in the universal form, of the first representation is imparted into the second representation.

In some embodiments the transformation of the first representation into the universal form is performed according to preconfigured specification, of the environment, for transforming representations of service instance managers, in which the transformation converts the variables in the first representation into the constants for inclusion in the universal form, and the universal form thereby lacks the variability of the first representation, where the generating the second representation uses the universal form lacking the variability of the first representation. This has an advantage in that the universal form is something that the environment is already preconfigured to produce and in a known/expected form, meaning there is already familiarity with the form and it is not necessary to select and define a new form, thereby easing the implementation of aspects described herein.

In some embodiments, obtaining the universal form includes accessing the first representation and performing the transformation of the first representation to obtain the universal form. Additionally, in some embodiments, generating the second representation includes producing an initial translation of the universal form. The initial translation can lack the variability imparted by the variable information of the first representation. The generating can further include converting the initial translation into the second representation. The converting can impart the variability in the second representation. This has an advantage in that the variability, which has been lost in the universal form, of the first representation is imparted into the second representation, and this is done via a straight-forward approach of first producing an initial translation with literals, followed by imparting the variability (by way of variables) to result in the second representation with the desired variability. Thus, in some examples, the converting the initial translation includes, for each variable of one or more variables identified in the first representation, identifying at least one position, in the initial translation, at which the variable identified in the first representation is realized as a literal value, and replacing the literal value, at the at least one position in the initial translation, with a variable that corresponds to the variable identified in the first representation.

In some embodiments, the one or more variables and corresponding literal values thereof are identified for the first representation in a first custom resource, and the method further includes generating a second custom resource identifying, for the second representation, the one or more variables and the literal values thereof. This has advantages in that it carries to the second representation the same literals/implementing values that existed for the first representation, which provides a fully equivalent service instance manager but implemented in the different technology, which in turn enables the second representation to completely replace the first representation and/or provides a starting point, equivalent to the first representation, from which to expand, augment, or change the service instance manager as desired.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are methods for automatically generating service instance managers. For instance, from a first representation of a service instance manager for an environment, a second representation of the service instance manager is automatically generated, where the first representation and second representation are implemented (for instance programmed, written, coded, etc.) in different technologies. In some embodiments, the environment is, or includes, a container orchestrator for orchestrating containers. A specific example of a container orchestrator is Kubernetes®, a project maintained by the Cloud Native Computing Foundation. Various aspects described herein are presented in the context of Kubernetes® operators, however this is by way of example only and not limitation; concepts described herein are applicable to other types of service lifecycle management in any of various container (or other virtual entity) orchestration technologies/environmentsd. For instance, other such technologies include OpenShift® developed by RedHat, Inc., (Raleigh, North Carolina, USA, of which OPENSHIFT is a registered trademark), Cloud Foundry® developed by the Cloud Foundry Foundation (San Francisco, California, USA; CLOUD FOUNDRY is a registered trademark of The Linux Foundation, San Francisco, California, USA), Docker® developed by Docker, Inc. (Paolo Alto, California, USA, of which DOCKER is a registered trademark), Apache Mesos® developed by the Apache Software Foundation (Wakefield, Massachusetts, USA, of which MESOS is a registered trademark), and Nomad developed by HashiCorp (San Francisco, California, USA), among others.

Figure 1:
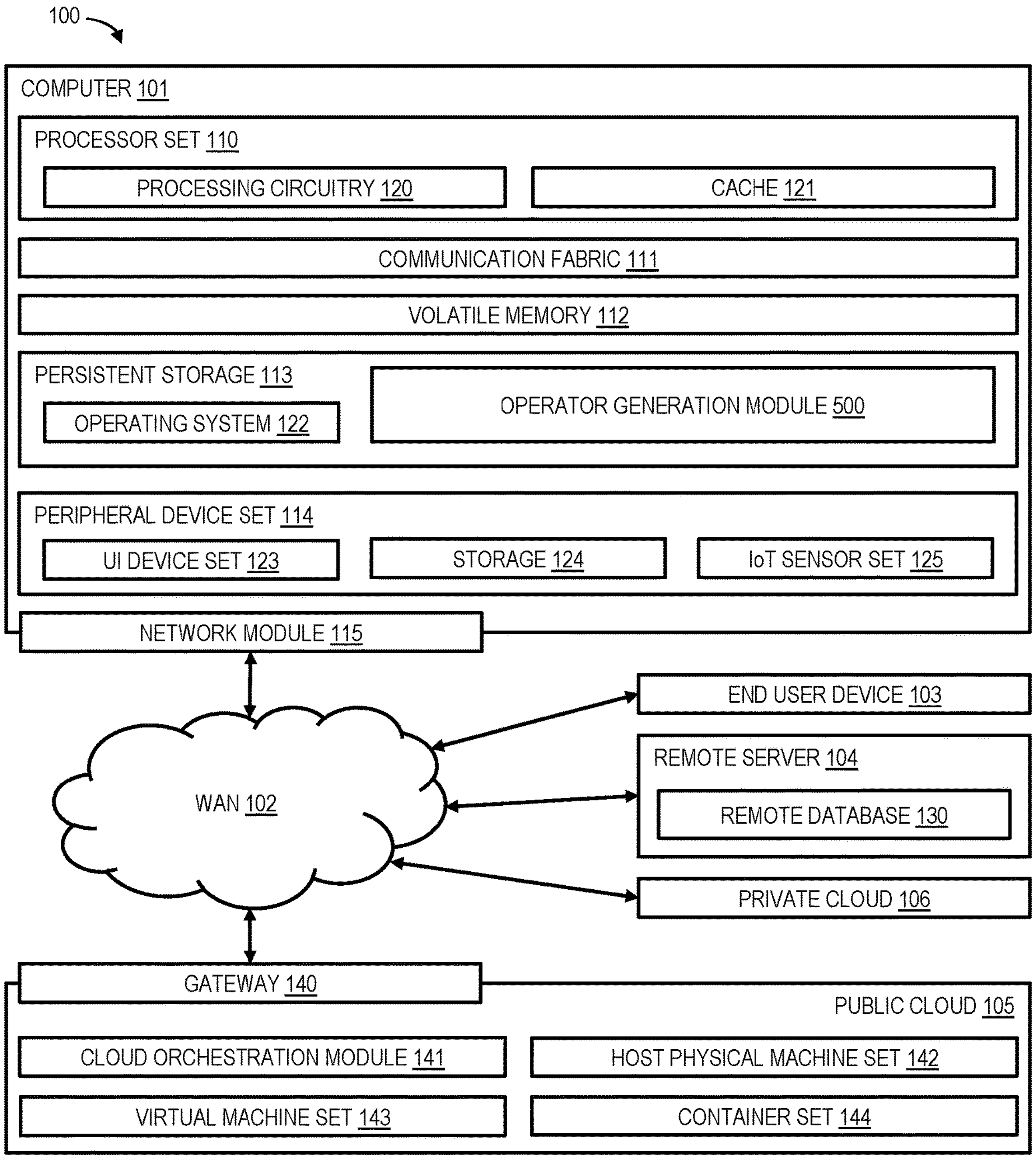
FIG. 1 depicts an example computing environment to incorporate and/or use aspects described herein.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code of operator generation module 500. In addition to block 500, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 500, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 500 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 500 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth® connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices (BLUETOOTH® is a registered trademark of BLUETOOTH SIG, INC., Kirkland, Washington). Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as “images.” A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Additional variations are possible.

In examples, aspects provide conversion of a service instance manager, such as a Kubernetes® operator, represented in one technology (code, language, etc.) into a representation in a different technology. Such conversion from the first (source) representation of the service instance manager to the second (target) representation of the service instance manager could be performed automatically, in examples. Further, as described herein, the automatic generation can be performed using a universal intermediate format, also referred to herein as a ‘universal form’, into which the source representation is transformed via a transformation. The universal form could include resources used by a container orchestrator in managing service instances pursuant to the service instance manager. Using the example of Kubernetes®, the universal form could be Kubernetes® resources into which a source Kubernetes® operator is transformed by the Kubernetes® platform when the operator is invoked. The generation of a target representation, a target Kubernetes® operator for example, could use the universal form and additionally use information contained in the source representation the source Kubernetes® operator. In this manner, the universal form can be supplemented with information contained in the original format during the creation of a target representation as a new structure. Aspects leverage the universal form, which is a universal transformation from any given initial form (e.g., source operator), together with the initial form, in order to recover information that was lost in the transformation to the universal form. As examples, variable information, recovered from the first/source representation, may be lost by the transformation of the first representation into the universal form. Recovery of this information can facilitate automated generation of the target representation as described herein.

In the context of a Kubernetes® environment, an example method works by generating a set of Kubernetes® resources from a source operator programmed in one technology, for instance implemented in one language or representation, then generating a target operator programmed in another technology (implemented in another language or representation) by referencing the Kubernetes® resources as well as placeholders for variable data from the source operator. A system to implement such method is thereby able to create a coupling between the original (source) and new (target) Kubernetes® representations via the universal intermediate format (resources) and information from the source operator representation that is missing from the resources.

Aspects can solve the problem of generating operators in a target technology from an operator programmed in a source technology as long as the target operator technology supports that which is implemented in the source operator of the source technology. For example, and as noted above, developers new to operators often implement them using the Helm technology because it is a relatively easy-to-use technology, and therefore an easy way to get started implementing operators. Helm supports only Level I and II operators on the well-known scale of operator capabilities published by the operator Framework. When the developers eventually want to add more sophisticated capabilities to their operators, that can require higher level operators, the programming of which currently requires a more sophisticated technology such as Ansible® for automation or Go (Golang) for programming. However, writing operators in Go can require greater programmer sophistication, which is why many developers initially implement operators using Helm. To add capabilities of Level III and greater to a Helm operator, it must first be recreated as an equivalent operator implemented in a technology able to support Level III and greater capabilities, such as the Go technology as one example.

There is currently a significant number of operators implemented in Helm. For these to become more sophisticated, they should be reimplemented in another technology such as Go. Developers can leverage aspects described herein to achieve this though automatic conversion of an operator implemented in one technology, such as Helm, into an equivalent operator implemented in another technology, such as Go. No tools exist to automate the transformation of a Kubernetes® operator implemented in one technology into an equivalent Kubernetes® operator implemented in another technology.

An approach to transform an operator is to convert directly from the source technology to the target technology. While some tools exist in other contexts to transform from one technology to another, such as a cross compiler for translating computer code from one language to another, use of that approach leads to a combinatorial explosion of converters, as discussed with reference to FIG. 2 below. Another approach might transform from one technology to another using a third intermediate technology, but this can be problematic if it assumes that the intermediate version includes all information needed to generate the final target form (and therefore ignores the initial form). In other words, an approach that uses an intermediate form might generate the final form while ignoring the original form because all information needed exists in the intermediate form.

Generation of an example service instance manager, such as a target Kubernetes® operator, is not straight-forward. Because Kubernetes® resources generated from operators do not show which values are variables, both the Kubernetes® resources and the original Kubernetes® operator are needed to generate a target Kubernetes® operator. operators have variability to generate different resources under different variable scenarios. In other words, the source representation of the service instance manager (e.g., the source Kubernetes® operator) includes variable information, for instance variables, that impart variability in the source representation. However, in use of the representation, for instance by the Kubernetes® environment, the operator is transformed into a universal form (Kubernetes® resources), and, as part of that, the variability of the operator is transformed into constants and therefore the universal form does not incorporate the variability that was present in the source representation. Aspects described herein can therefore use both the source representation (e.g., the original Kubernetes® operator) and this universal form (e.g., Kubernetes® resources) to generate the target representation (e.g., target Kubernetes® operator), as described.

In the task of generating a target operator from a source operator, a universal intermediate form makes the set of converters much more manageable and provides more opportunity to reuse existing code libraries that support converting to and from the universal intermediate form. Kubernetes® in particular already has a universal intermediate form that operators already support, and that is Kubernetes® itself, and namely the schema of Kubernetes® resources used to configure a Kubernetes® cluster. Kubernetes® is preconfigured by way of its specification to transform the operator into Kubernetes® resources in implementing operator functionality. Accordingly, an approach provided herein to convert from a service instance manager programmed in one technology to one programmed in another technology is to convert the source representation into a universal form that works for all technologies. For a Kubernetes® operator, the universal form is the set of resources of Kubernetes® itself that the operator's functionality creates and deploys into a cluster. In this regard, transformation of the source representation into the universal form can be performed according to preconfigured specification of the environment (Kubernetes® environment in this example) for transforming representations of service instance managers. Kubernetes® can natively produce the universal form, in which variables in the first representation are converted into constants that are included in the universal form. The universal form thereby lacks the variability of the first representation.

As discussed above, the universal/intermediate form generated from the original operator is one literal example of the operator, in which some of the information that was embedded in the original operator (e.g., variability for instance) is lost. By way of specific example, the variables in a Helm operator whose values are specified in each custom resource that triggers the operator become embedded in the Kubernetes® resources. Generating an operator from just the literal example of the Kubernetes® resources would have no knowledge that some of the literals were specified as variables in the source operator. However, it is desired to embed such variability in the target operator if the target is to accurately represent the service instance manager. Thus, to generate the target operator, a process must not only work from the Kubernetes® resources (the universal form) but also find the variables in the original operator and reinsert that custom information into the target operator as well (i.e., ignoring and replacing the hardcoded values in the Kubernetes® resources with variables).

Accordingly, aspects described herein can be used to transform a first representation of a service instance manager, the first representation implemented using (i.e., programmed in) one technology, into a second representation of the service instance manager, the second representation implemented using (i.e., programmed in) another technology that is different. By way of example, aspects can transform a Kubernetes® operator implemented using one technology into another Kubernetes® operator implemented using another, different, technology. Operators can be implemented in a variety of technologies, including Helm, Ansible® for automation, Go for programming, and many others. Transforming directly from one technology to another would be very complex, and the resulting any-to-any transformation would become a combinatorial explosion. Four technologies would require twelve transformations, five technologies would require twenty transformations, and so on. Kubernetes® is preconfigured to execute any well-defined operator to produce a set of Kubernetes® resources-resources that will be equivalent regardless of the technology (Helm, Ansible®, Go, etc.) used to implement the operator in the first place. The Kubernetes® resources are, in this regard, a universal form produced by all such operators regardless of their representation.

Figure 2:
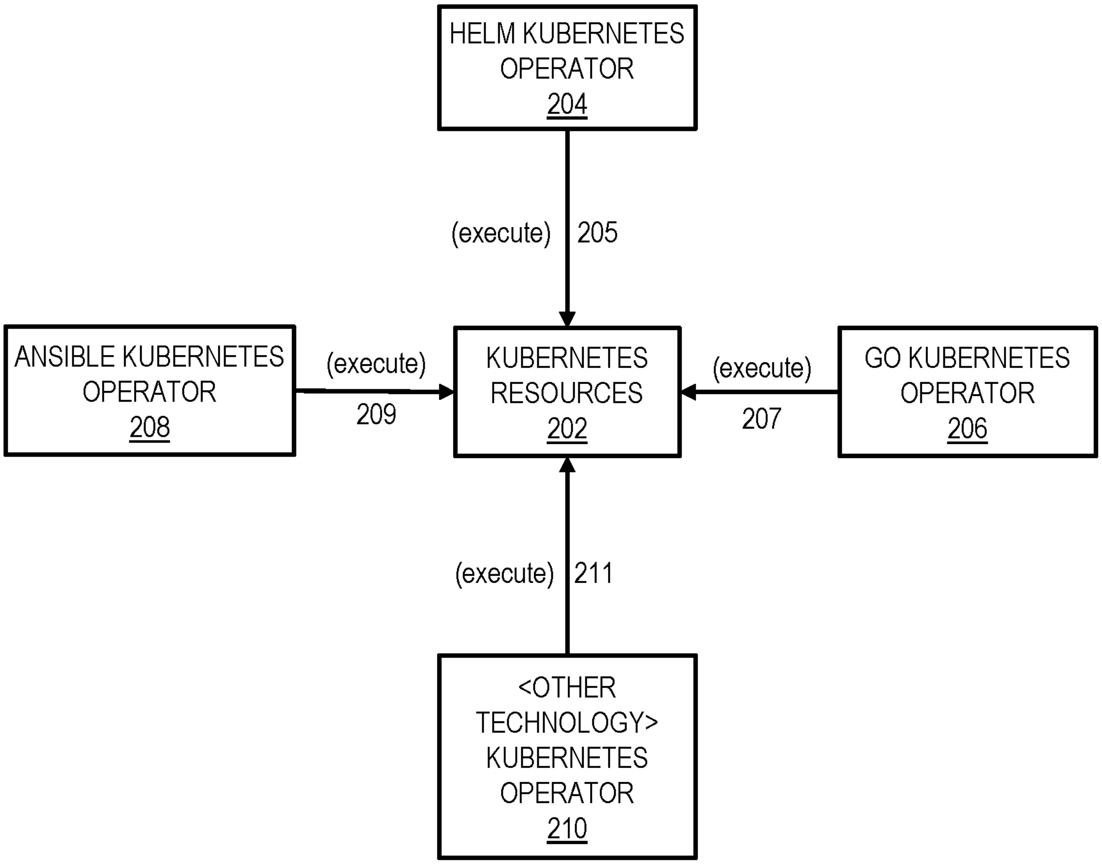
FIG. 2 depicts a conceptual diagram of the relationship between Kubernetes®-resources and operators implemented in different technologies (KUBERNETES® is a registered trademark of LF Projects, LLC, Wilmington, Delaware)

FIG. 2 depicts a conceptual diagram of the relationship between Kubernetes® resources and operators implemented in different technologies. Four operators 204, 206, 208, 210 programmed in different technologies may each be executed to produce Kubernetes® resources 202-*a* form that is universal/common regardless of the technology in which the generating operator was written. FIG. 2 demonstrates the combinatorial explosion of any-to-any transformation for just four operator technologies, and how any operator produces the same universal form, i.e., set of Kubernetes® resources.

Although any operator (204, 206, 208, 210) produces the universal form of a set of Kubernetes® resources, an operator, say one programmed in a different technology, cannot be derived completely from this universal form, as was described above, when the operator includes variables that specify how the resources are configured, as these variables are configured as constants in the resources 202.

Instead, a method that generates an operator implemented in a second technology performs the generation using both the universal form (e.g., Kubernetes® resources) as well as the original operator implemented in the first technology. For example, the method can produce a target Kubernetes® operator programmed in Go that creates the same Kubernetes® resources (i.e., is an equivalent operator) as a Helm Kubernetes® operator programmed in Helm.

Figure 3:
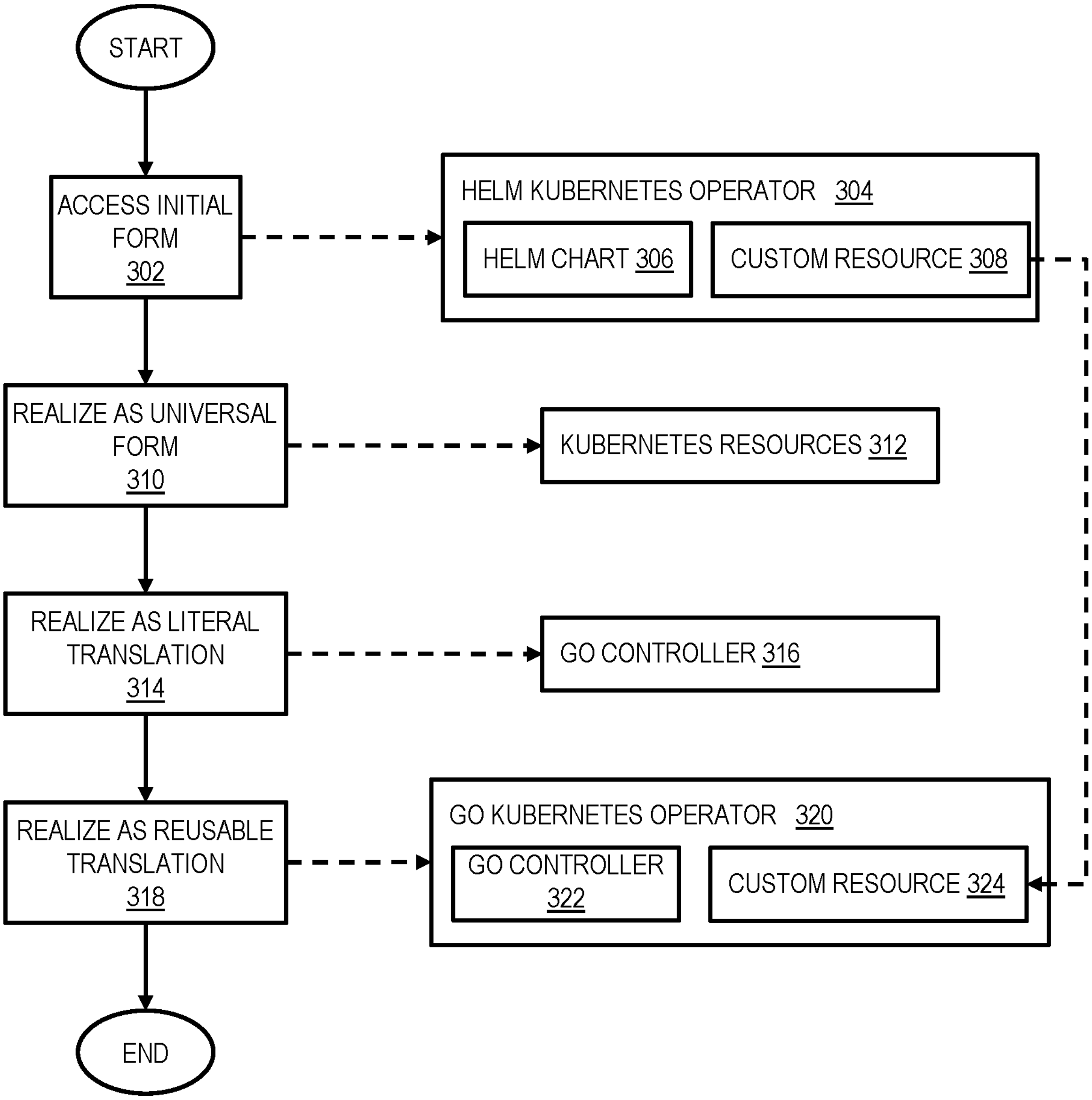
FIGS. 3-4 depict example processes for generating an operator implemented in a second technology using a universal form and an original operator implemented in a first technology, in accordance with aspects described herein.
Figure 4:
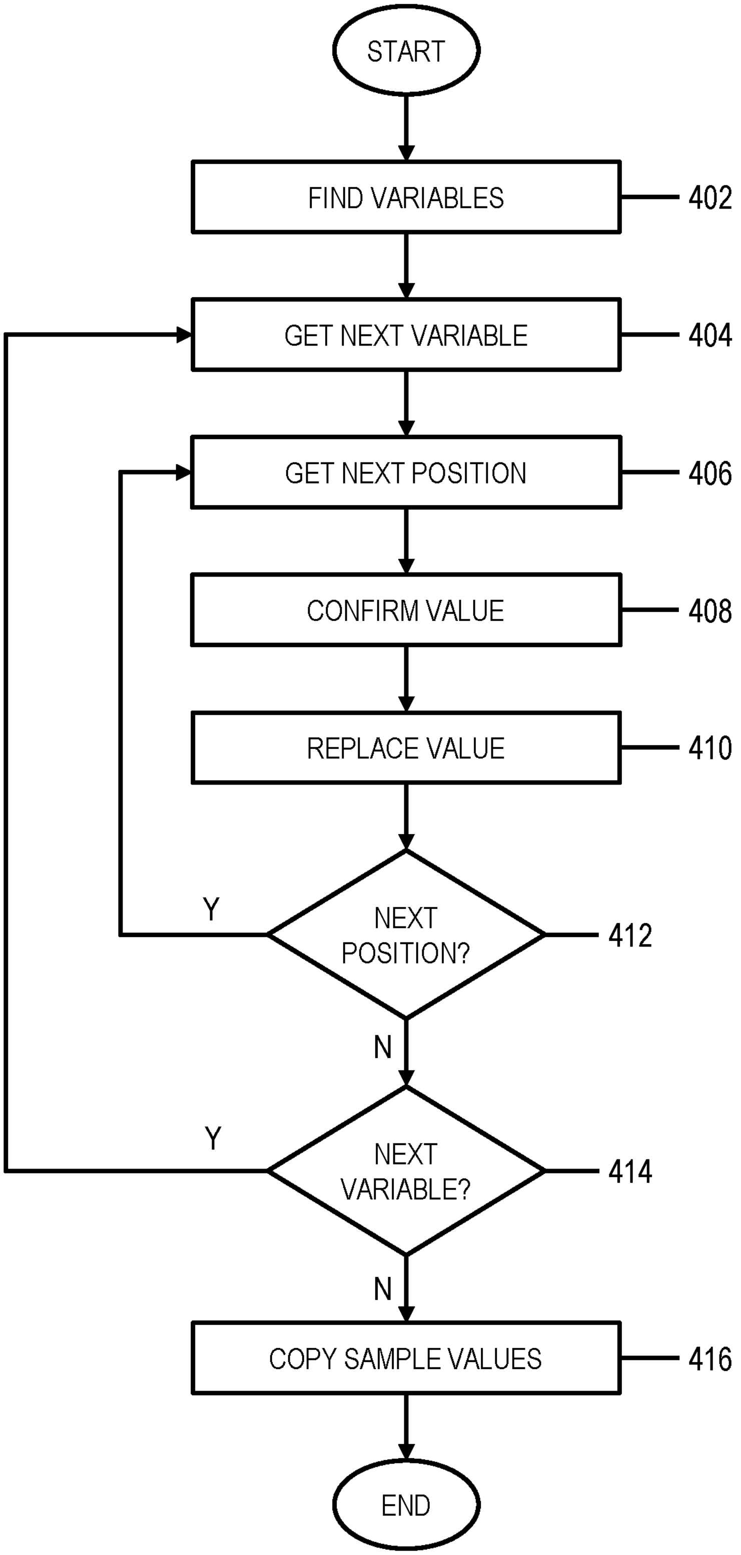

FIGS. 3-4 depict example processes for generating an operator implemented in a second technology using a universal form and an original operator implemented in a first technology, in accordance with aspects described herein. It is noted that in the Kubernetes® technology, operators are often configured using data or other properties specified in a 'custom resource'. As an example, variables and corresponding literal values thereof may be identified in a custom resource for the operator. The operator uses the custom resource to determine how to literalize those variables. In the example of FIG. 3, there is a single custom resource 308 shown for the source operator 304, however there may in other examples be multiple custom resources. The existence of a custom resource is what triggers Kubernetes® to run the operator, which in turn runs a controller aspect of the operator, implementing the desired pattern to achieve the desired state for the service instance being managed.

Referring initially to FIG. 3, the process starts and proceeds by accessing (302) the initial form, i.e., the first representation of the service instance manager programmed in the first technology, which here is the Helm Kubernetes® operator 304. This operator includes Helm chart 306 and the sample values stored in the Kubernetes® custom resource 308.

The process proceeds by realizing/obtaining (310) this first representation as a universal form. In this aspect, the method accesses and uses the Helm Kubernetes® operator 302 including the custom resource 308 to create a corresponding set of Kubernetes® resources 312, which are of the universal form that all operators produce. The Kubernetes® resources 312 implement a complete artifact, such as an application. For example, this aspect (310) performs a transformation of the first representation to obtain the universal form. In the context of Kubernetes®, the operator calls an application programming interface (API) to run commands on the API, and the API responds by performing the commands, which generate the universal form-here, the resources 312. Running an operator, for instance one that generates a service instance, once with a custom resource generates one service instance by defining one set of Kubernetes® resources for that one service instance.

The process proceeds by realizing (314) the universal form as a literal translation in the target technology. For example the process uses the Kubernetes® resources 312 to generate a corresponding Go controller 316 as a literal (initial) translation of the universal form. This literal translation, if executed, would recreate the Kubernetes® resources 312, but do so exactly as they are, i.e., lacking any of the variability that existed by way of the variable information of the source operator 304. For example, this literal translation (Go controller 316) has no variables and therefore can generate only that exact set of Kubernetes® resources 312.

The process then realizes (318) the literal translation as a reusable translation. Here, this is done by converting the literal translation into the target Go operator 320. The Go operator 320 works the same as the original Helm Kubernetes® operator 304, and has impart therein the variability present in the source operator.

As part of this conversion of this initial, literal translation into the target operator, the process can, for each variable identified in the first representation, identify position(s), in the initial translation, at which the variable is realized as a literal value, and replace the value, at the those position(s) in the literal translation, with a variable that corresponds to the variable identified in the first representation. FIG. 4 depicts such a process for converting the initial translation into the second representation, where the converting imparts the variability (that is present in the first representation) into the second representation. The process of FIG. 4 begins and proceeds to find (402) the variable(s) present in the initial form (the Helm operator 304, for instance in the Helm chart 306 thereof in FIG. 3). It then enters a first-outer-loop by getting (404) a next of those variable(s) to process. The process then enters a second-inner-loop by getting (406) a next position of that variable in the literal translation, and based on that variable's position in a template in the Helm chart. That is, it finds the same position of the variable in the Go controller's code (316 of FIG. 3). It confirms (408) that the value in that position in the Go controller's code is the same as that value for that variable in the custom resource 308 of the Helm Kubernetes® operator 304, and then (assuming confirmed) replaces (410) the value in that position in the Go controller's code with a variable that corresponds to the variable in the Helm Kubernetes® operator 304. The process then determines (412) whether there is a next position of this variable in the source operator/first representation and if so (412, Y), returns to 406 to get this next position and thus iterates the inner loop. Otherwise (412, N) there are no more positions in which this variable appears. The process exits the inner loop in that case and proceeds to determine (414) whether there is a next variable in the initial form to process. If so (414, Y), the process returns to 404, and thus iterates the outer loop, to get the next variable and replace the literal values with the variable. Otherwise (414, N), there are no more variables to process, and the process of FIG. 4 exits the outer loop at that point.

After iterating through the variables and their positions is complete (414, N), then at this point the process carries forward the literal implementation(s) exhibited by the custom resource(s) of the source operator by copying those sample values (416). It does so by generating a custom resource(s) identifying, for the created target operator, the variable(s) and the literal value(s) thereof that existed for the source operator. In a specific example, the process copies the custom resource 308 from the Helm Kubernetes® operator 304 for use by the Go Kubernetes® operator 320 as custom resource 324 of FIG. 3.

At this point, a target operator 320 has been produced that is equivalent to the source operator and includes the same variability. As the source operator is a first representation of a service instance manager, the target operator is a second representation of that service instance manager, where the first and second representations are programmed in different technologies. In FIGS. 3-4, the example technologies are Helm and Go, though this is by way of example only, and not limitation.

With the new representation generated, developers can then further develop the target operator, for instance by editing, augmenting, expanding, etc., the operator to do more and/or different activities as desired. Advantageously, the second representation may be in a more extensible technology suited for higher-level activity, if desired, for instance activity that was not implementable by the technology of the source operator.

Service instance managers, such as operators in the case of Kubernetes®, case the operational complexity of installing, monitoring, and managing service/software instances in an environment. Organizations often start developing operators using a relatively less complex technology but eventually desire to evolve the maturity of the operator, and consequently need to move to a more capable technology. Since there is no easy way to convert these existing artifacts, aspects described herein provide an approach to ease this process. This enables software vendors and ecosystem partners to build and operate their solutions by enabling them to convert service instance managers implemented in one technology into ones implemented in a different technology.

By way of specific example, aspects described herein could be helpful in the operator software development kit (SDK) offered as part of the Operator Framework, a public open-source tool for developing operators. The toolkit enables users to implement operators using any of multiple technologies (e.g., Helm, Ansible®, Go, etc.). Incorporating facilities described herein would also provide users with the automation to convert an operator implemented in one technology into an operator implemented in a different technology.

Figure 5:
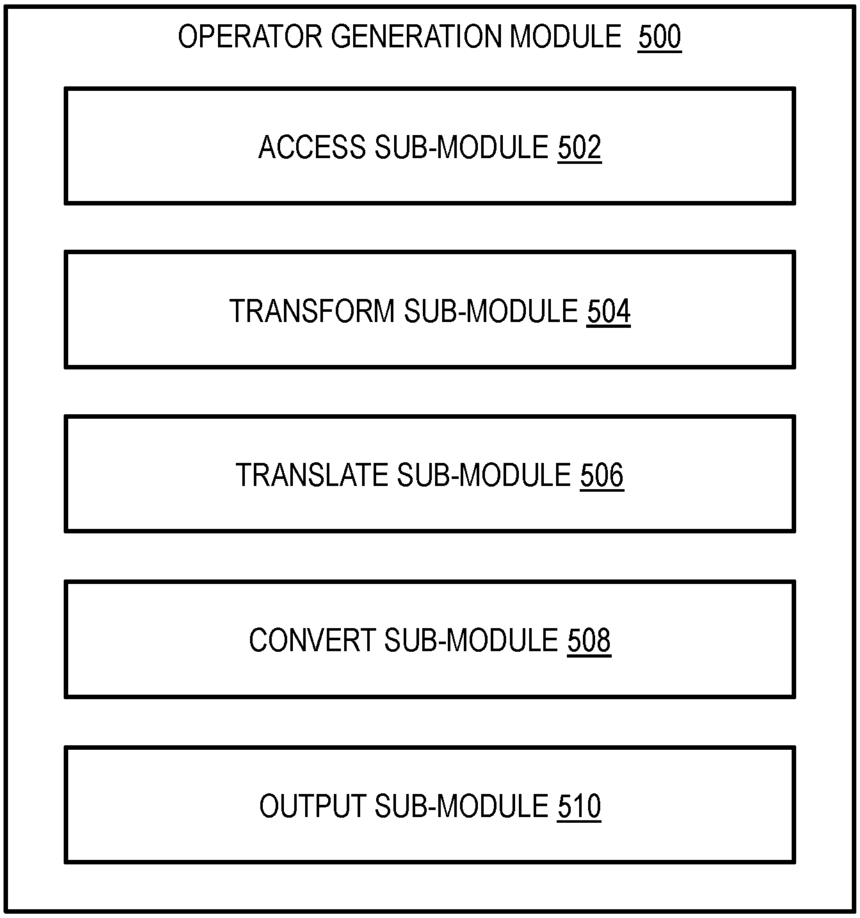
FIG. 5 depicts further details of an example operator generation module to incorporate and/or use aspects described herein.

FIG. 5 depicts further details of an example operator generation module (e.g., operator generation module 500 of FIG. 1) to incorporate and/or use aspects described herein. In one or more aspects, operator generation module 500 includes, in one example, various sub-modules to be used to perform automatic generation of a second representation of a service instance manager from a first representation of the service instance manager. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, server 104, or computers of cloud 105/106 of FIG. 1, as examples.

Referring to FIG. 5, module 500 includes access sub-module 502 for accessing the service instance manager in its initial form, i.e., as a first representation in a first technology, a transform sub-module 504 for obtaining the universal form, a translate sub-module 506 for producing the initial/literal translation of the universal form, a convert sub-module 508 for converting the initial translation into a reusable translation of the service instance manager, i.e., the service instance in a second representation in a second technology, by imparting variability in the second representation, and an output sub-module 510 for outputting the second representation.

FIGS. 6A-6D depict example processes for automatic generation of a service instance manager, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 6A-6D are part of a module, such as module 500. In other examples, the code may be included in one or more modules and/or in one or more sub-modules of the one or more modules. Diverse options are available.

Figure 6A:
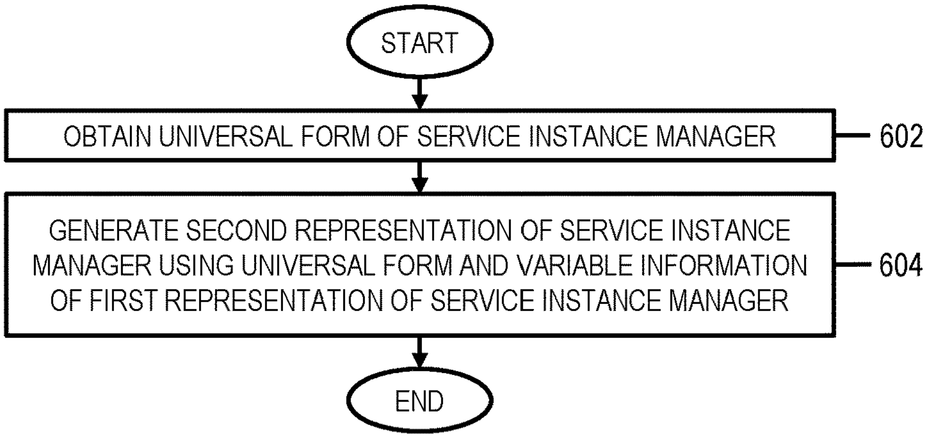
FIGS. 6A-6D depict example processes for automatic generation of a service instance manager, in accordance with aspects described herein.

FIG. 6A depicts an example process for automatically generating, from a first representation of a service instance manager for an environment, a second representation of the service instance manager. The first representation and second representation are programmed in different technologies. In examples, the first representation is a source operator programmed in a first language and the second representation is a target operator programmed in a second language. In examples, the first representation is a first Kubernetes® operator, and the second representation is a second Kubernetes® operator programmed in a different language than is the first operator. Referring to FIG. 6A, the process obtains (602) a universal form into which the first representation was transformed via a transformation. In examples, the universal form includes resources generated from the first representation. In the specific example of Kubernetes®, the first representation is a first operator and the universal form includes Kubernetes® resources generated from the first operator.

Figure 6B:
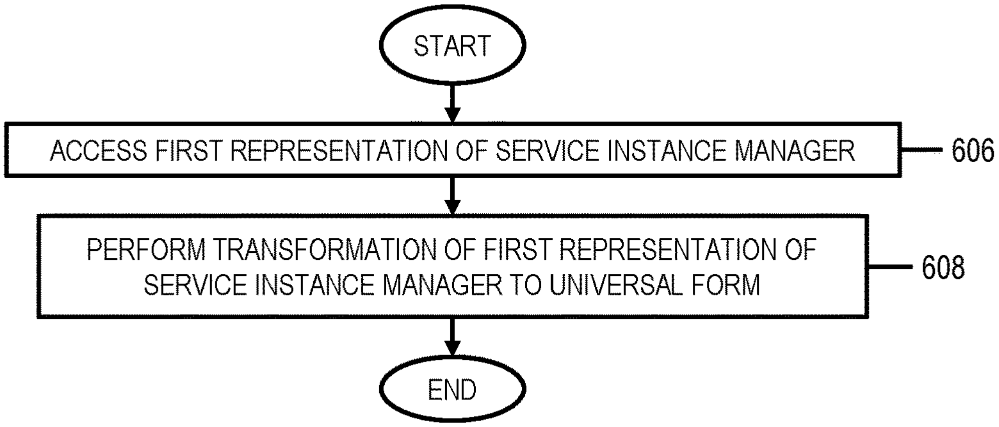

FIG. 6B depicts an example process for obtaining (602 of FIG. 6A) the universal form. Referring to FIG. 6B, the process accesses (606) the first representation and performs (608) the transformation of the first representation to obtain the universal form. As an alternative to this, for instance in cases in which the universal form is already in existence, the obtaining (602) by the process of FIG. 6A could access or receive the already-existing universal form.

Referring back to FIG. 6A, the process continues from 602 by generating (604) the second representation using the universal form and variable information. In examples of this, the variable information is recovered from the first representation after it was lost by the transformation of the first representation into the universal form. The variable information can include variables in the first representation that impart variability in the first representation, where that variability is configured as constants in the universal form. Automatic generation of the second representation in these situations has an advantage in that the variability, which has been lost in the universal form, of the first representation is imparted into the second representation.

The transformation of the first representation into the universal form could be made according to a preconfigured specification, of the environment (such as Kubernetes®), for transforming representations of service instance managers (e.g., operators). As part of this, the transformation can convert variables that exist in the first representation into the constants that are included in the universal form. The universal form can thereby lack the variability of the first representation due to the use of constants, rather than variables. Therefore, the generating (604) of the second representation can use the universal form (lacking the variability of the first representation) in conjunction with the variable information of the first representation. In such embodiments an advantage is provided in that the universal form is something that the environment is already preconfigured to produce and in a known/expected form, meaning there is already familiarity with the form and it is not necessary to select and define a new form, thereby easing the implementation of aspects described herein.

After the second representation has been generated, it can then be output for use with the container orchestrator or other environment in which the service instance manager operates. Automatic generation of the second representation of the service instance manager from the first representation of the service instance manager, where they are programmed in different technologies, enables easy conversion therebetween without manual reprogramming of the service instance manager in a different technology. This in turn has an advantage in that it facilitates efforts to expand/augment the capabilities of the service instance manager, and in particular when the technology in which the initial (first) representation is programmed is limited in that regard. By generating an equivalent service instance manager but in a second representation programmed in a different, more robust technology than the initial technology, developers are no longer limited to what is supported by the initial technology. In embodiments where the container orchestrator is Kubernetes, where the first representation is a first Kubernetes operator programmed in a first language and the second representation is a second Kubernetes operator programmed in a second language that is different from the first language, and the universal form includes Kubernetes resources generated from the first Kubernetes operator, an advantage is provided in that the capability is expanded to container environments in which service instance management often occurs on a large scale and reliance on rapid development of increasingly sophisticated managers is common.

Figure 6C:
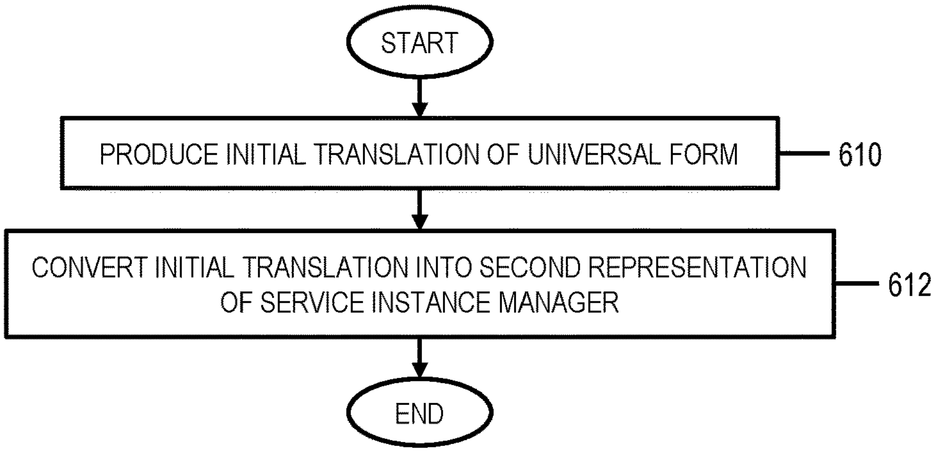

FIG. 6C depicts an example process for 604 of FIG. 6A, i.e., the generating the second representation using the universal form and variable information. The process of FIG. 6C begins by producing (610) an initial translation of the universal form. The initial translation lacks the variability imparted by the variable information of the first representation. The process then converts (612) the initial translation into the second representation, which conversion imparts, in the second representation, the variability that was present in the first representation and lost in transforming the first representation to the universal form. This has an advantage in that the variability, which has been lost in the universal form, of the first representation is imparted into the second representation, and this is done via a straight-forward approach of first producing an initial translation with literals, followed by imparting the variability (by way of variables) to result in the second representation with the desired variability.

Figure 6D:
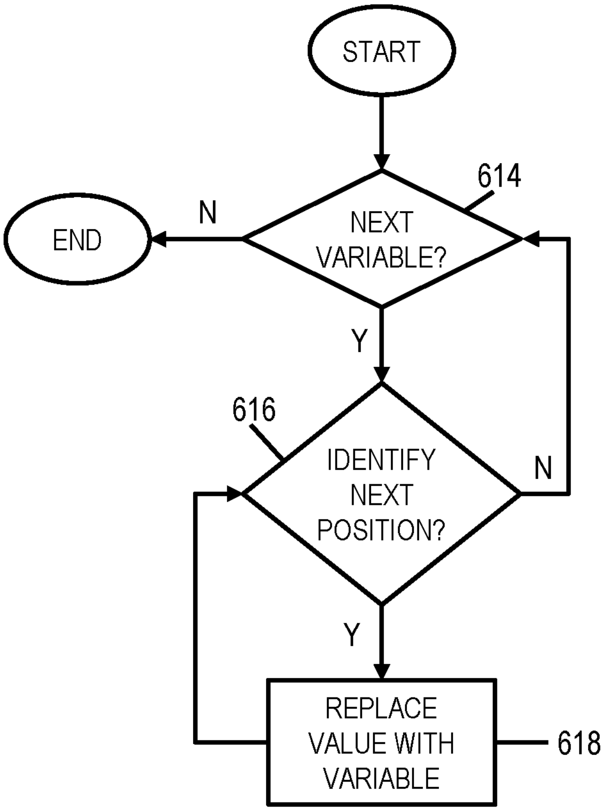

FIG. 6D depicts an example process for the converting (612) of FIG. 6C, and includes inquiry 614 to determine whether there is a next variable to process. This inquiry will enter a loop for the next variable, if present. If not (614, N), the process ends. Otherwise (614, Y), the process enters the loop and determines (616) whether a next position, in the initial translation, is found at which the variable identified in the initial translation is realized as a literal value. If so (616, Y), the process replaces (618) the value, at that position in the initial translation, with the variable. Otherwise (618, N), no next position was identified, and the process proceeds back to 614 to (potentially) iterate for a next variable identified in the first representation. In this manner, for each variable of one or more variables identified in the first representation, the process will identify at least one position, in the initial translation, at which the variable identified in the first representation is realized as a literal value, and replace the value, at the at least one position in the initial translation, with a variable that corresponds to the variable identified in the first representation.

In connection with imparting variability to the initial/literal translation to produce the second representation with variability, a custom resource for the second representation can be generated. As the variable(s) and corresponding literal values thereof can be identified for the first representation in a first custom resource, the processing of FIG. 6A and/or 6D can generate a second custom resource that identifies, for the second representation, the variable(s) and the literal values thereof. This has advantages in that it carries to the second representation the same literals/implementing values that existed for the first representation, which provides a fully equivalent service instance manager but implemented in the different technology, which in turn enables the second representation to completely replace the first representation and/or provides a starting point, equivalent to the first representation, from which to expand, augment, or change the service instance manager as desired.

Although various embodiments are described above, these are only examples.

The terminology used herein is for the purpose of describing particular embodiments only and is not intended to be limiting. As used herein, the singular forms “a”, “an” and “the” are intended to include the plural forms as well, unless the context clearly indicates otherwise. It will be further understood that the terms “comprises” and/or “comprising”, when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:

automatically generating, from a first representation of a service instance manager for an environment, a second representation of the service instance manager, the first representation and second representation being programmed in different technologies, wherein the automatically generating comprises:

obtaining a universal form into which the first representation was transformed via a transformation; and generating the second representation using the universal form and variable information, wherein the variable information was lost by the transformation of the first representation into the universal form and is recovered from the first representation.

2. The method of claim 1, wherein the environment comprises a container orchestrator, and wherein the universal form comprises resources used by the container orchestrator in managing service instances pursuant to the service instance manager.

3. The method of claim 2, wherein the first representation is a first operator programmed in a first language, wherein the second representation is a second operator programmed in a second language that is different from the first language, and wherein the universal form comprises resources generated from the first operator.

4. The method of claim 1, wherein the variable information comprises variables in the first representation that impart variability in the first representation, wherein the variability is configured as constants in the universal form.

5. The method of claim 4, wherein the transformation of the first representation into the universal form is performed according to a preconfigured specification, of the environment, for transforming representations of service instance managers, wherein the transformation converts the variables in the first representation into the constants for inclusion in the universal form, and the universal form thereby lacks the variability of the first representation, and wherein the generating the second representation uses the universal form lacking the variability of the first representation.

6. The method of claim 4, wherein the obtaining the universal form comprises:

accessing the first representation; and performing the transformation of the first representation to obtain the universal form.

7. The method of claim 6, wherein the generating the second representation comprises:

producing an initial translation of the universal form, wherein the initial translation lacks the variability imparted by the variable information of the first representation; and converting the initial translation into the second representation, wherein the converting imparts the variability in the second representation.

8. The method of claim 7, wherein the converting comprises, for each variable of one or more variables identified in the first representation:

identifying at least one position, in the initial translation, at which the variable identified in the first representation is realized as a literal value; and replacing the literal value, at the at least one position in the initial translation, with a variable that corresponds to the variable identified in the first representation.

9. The method of claim 8, wherein the one or more variables and corresponding literal values thereof are identified for the first representation in a first custom resource, and wherein the method further comprises generating a second custom resource identifying, for the second representation, the one or more variables and the literal values thereof.

10. A computer system comprising:

a memory; and a processor in communication with the memory, wherein the computer system is configured to perform a method comprising:

automatically generating, from a first representation of a service instance manager for an environment, a second representation of the service instance manager, the first representation and second representation being programmed in different technologies, wherein the automatically generating comprises:

obtaining a universal form into which the first representation was transformed via a transformation; and generating the second representation using the universal form and variable information, wherein the variable information was lost by the transformation of the first representation into the universal form and is recovered from the first representation.

11. The computer system of claim 10, wherein the environment comprises a container orchestrator, wherein the first representation is a first operator programmed in a first language, wherein the second representation is a second operator programmed in a second language that is different from the first language, wherein the universal form comprises resources generated from the first operator and used by in managing service instances pursuant to the service instance manager.

12. The computer system of claim 10, wherein the variable information comprises variables in the first representation that impart variability in the first representation, wherein the variability is configured as constants in the universal form.

13. The computer system of claim 12, wherein the transformation of the first representation into the universal form is performed according to a preconfigured specification, of the environment, for transforming representations of service instance managers, wherein the transformation converts the variables in the first representation into the constants for inclusion in the universal form, and the universal form thereby lacks the variability of the first representation, and wherein the generating the second representation uses the universal form lacking the variability of the first representation.

14. The computer system of claim 12, wherein the obtaining the universal form comprises:

accessing the first representation; and performing the transformation of the first representation to obtain the universal form.

15. The computer system of claim 14, wherein the generating the second representation comprises:

producing an initial translation of the universal form, wherein the initial translation lacks the variability imparted by the variable information of the first representation; and converting the initial translation into the second representation, wherein the converting imparts the variability in the second representation.

16. The computer system of claim 15, wherein the converting comprises, for each variable of one or more variables identified in the first representation:

identifying at least one position, in the initial translation, at which the variable identified in the first representation is realized as a literal value; and replacing the literal value, at the at least one position in the initial translation, with a variable that corresponds to the variable identified in the first representation.

17. The computer system of claim 16, wherein the one or more variables and corresponding literal values thereof are identified for the first representation in a first custom resource, and wherein the method further comprises generating a second custom resource identifying, for the second representation, the one or more variables and the literal values thereof.

18. A computer program product comprising:

a computer readable storage medium readable by a processing circuit and storing instructions for execution by the processing circuit for performing a method comprising:

automatically generating, from a first representation of a service instance manager for an environment, a second representation of the service instance manager, the first representation and second representation being programmed in different technologies, wherein the automatically generating comprises:

obtaining a universal form into which the first representation was transformed via a transformation; and generating the second representation using the universal form and variable information, wherein the variable information was lost by the transformation of the first representation into the universal form and is recovered from the first representation.

19. The computer program product of claim 18, wherein the environment comprises a container orchestrator, wherein the first representation is a first operator programmed in a first language, wherein the second representation is a second operator programmed in a second language that is different from the first language, wherein the universal form comprises resources generated from the first operator and used by in managing service instances pursuant to the service instance manager.

20. The computer program product of claim 18, wherein the variable information comprises variables in the first representation that impart variability in the first representation, wherein the variability is configured as constants in the universal form, wherein the obtaining the universal form comprises: accessing the first representation and performing the transformation of the first representation to obtain the universal form, wherein the transformation of the first representation into the universal form is performed according to a preconfigured specification, of the environment, for transforming representations of service instance managers, wherein the transformation converts the variables in the first representation into the constants for inclusion in the universal form, and the universal form thereby lacks the variability of the first representation, wherein the generating the second representation uses the universal form lacking the variability of the first representation, and wherein the generating the second representation comprises:

producing an initial translation of the universal form, wherein the initial translation lacks the variability imparted by the variable information of the first representation; and converting the initial translation into the second representation, wherein the converting imparts the variability in the second representation.

* * * * *